(12) United States Patent
Miyata et al.

(10) Patent No.: US 7,648,159 B2
(45) Date of Patent: Jan. 19, 2010

(54) AIRBAG APPARATUS, SADDLE-TYPE VEHICLE WITH AIRBAG APPARATUS

(75) Inventors: Yasuhito Miyata, Tokyo (JP); Takeshi Kuroe, Tokyo (JP)

(73) Assignees: Takata Corporation, Tokyo (JP); Honda Motor Co., Ltd., Tokyo (JP)

( * ) Notice: Subject to any disclaimer, the term of this patent is extended or adjusted under 35 U.S.C. 154(b) by 270 days.

(21) Appl. No.: 11/381,478

(22) Filed: May 3, 2006

(65) Prior Publication Data

US 2006/0249935 A1    Nov. 9, 2006

(30) Foreign Application Priority Data

May 9, 2005    (JP)    ............... 2005-136651

(51) Int. Cl.
*B60R 21/16* (2006.01)
(52) U.S. Cl. .................................. 280/730.1
(58) Field of Classification Search .............. 280/730.1, 280/728.1, 743.1
See application file for complete search history.

(56) References Cited

U.S. PATENT DOCUMENTS 5,609,363 A * 3/1997 Finelli ..................... 280/743.2
5,938,231 A * 8/1999 Yamazaki ................. 280/730.1
5,967,545 A * 10/1999 Iijima et al. .............. 280/730.1
6,113,133 A * 9/2000 Iijima et al. .............. 280/730.1
6,848,709 B2 * 2/2005 Nagatsuyu ................ 280/730.1
6,854,762 B2 * 2/2005 Yanagibashi et al. ........ 280/736
7,350,802 B2 * 4/2008 Yatagai et al. ............ 280/730.1
2003/0214121 A1 * 11/2003 Miyata et al. ............ 280/730.1
2004/0007855 A1 * 1/2004 Kurata et al. ................ 280/729
2004/0017066 A1 * 1/2004 Kuroe et al. ............. 280/730.1
2005/0040628 A1 * 2/2005 Miyata .................... 280/730.1
2005/0236817 A1 * 10/2005 Sonoda et al. ........... 280/730.1

FOREIGN PATENT DOCUMENTS

JP    2002137777    5/2002

* cited by examiner

*Primary Examiner*—Eric Culbreth
(74) *Attorney, Agent, or Firm*—Fitch, Even, Tabin & Flannery

(57) ABSTRACT

An airbag apparatus is provided in which constraint of a rider in case of front collision is achieved. In one form, an airbag apparatus to be mounted to a motorcycle includes an airbag which is deployed and inflated in case of front collision of a vehicle. The airbag forms a constraining surface for constraining a rider when deployed and inflated, and is configured to be deployed and inflated while extending the constraining surface along the direction connecting the abdominal portion and the chest portion of the rider when constraining the rider.

13 Claims, 8 Drawing Sheets

[Fig. 1]
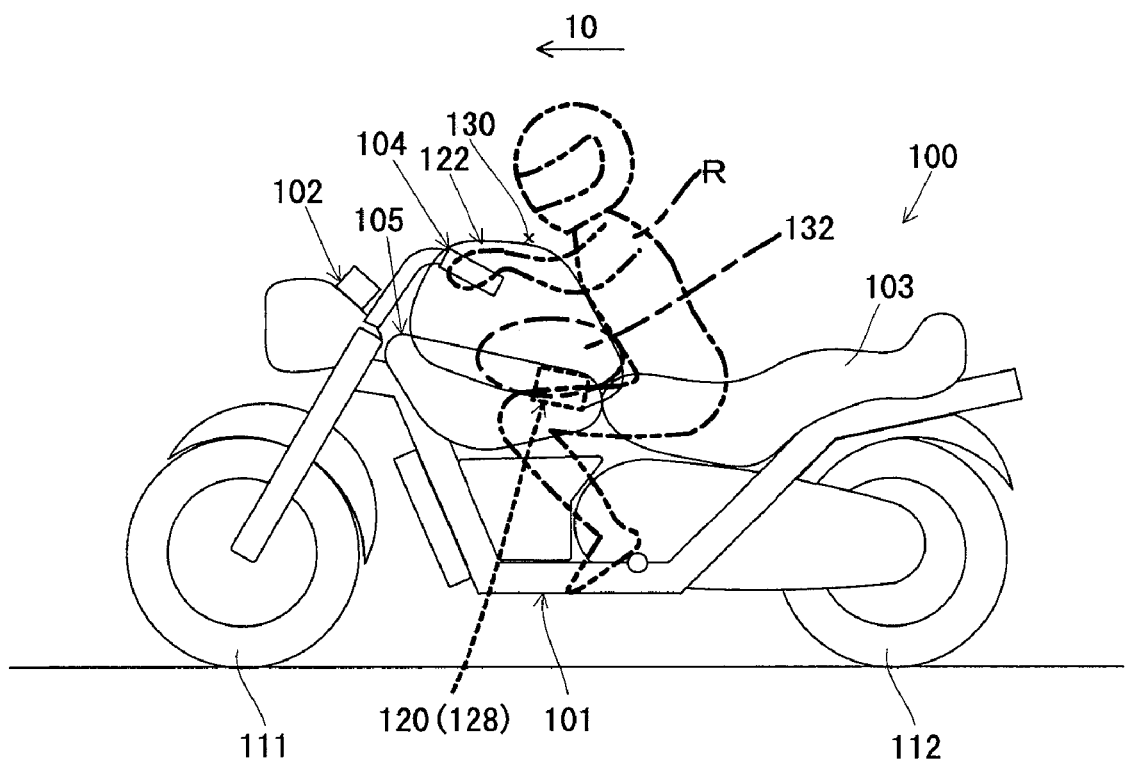

[Fig. 2]
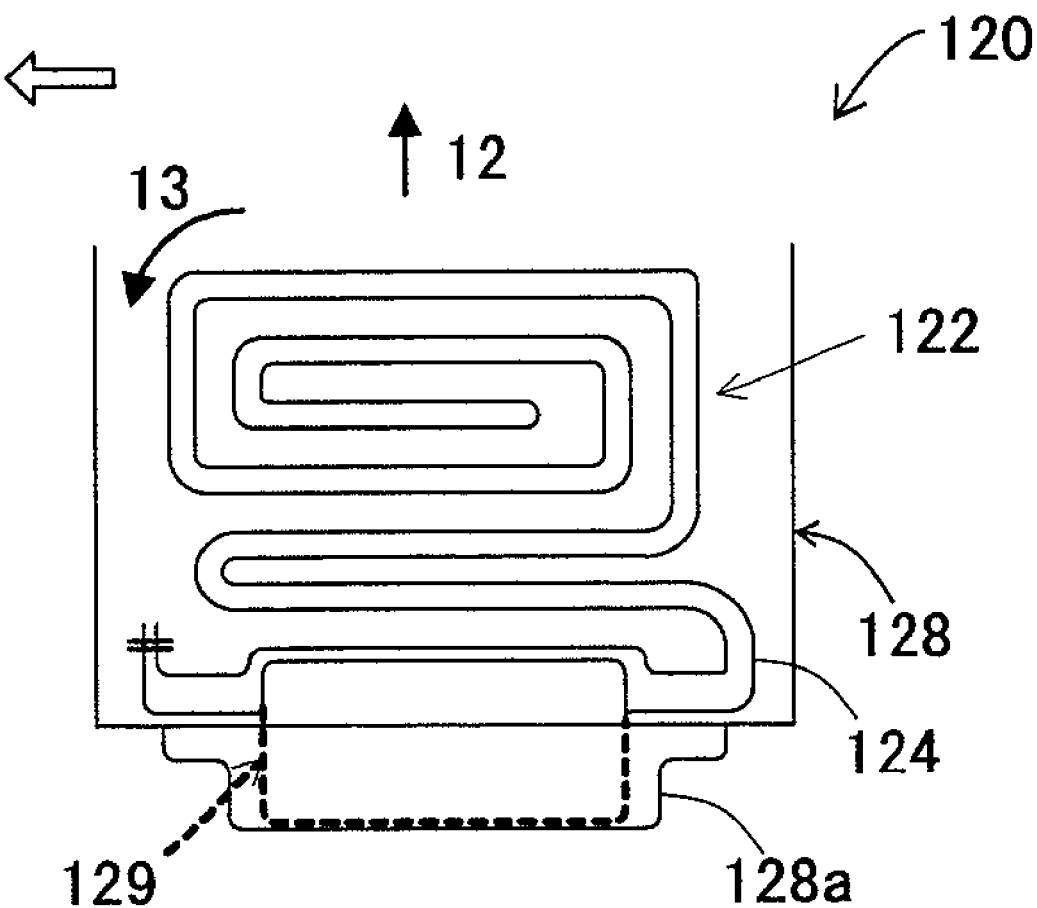

[Fig. 3]
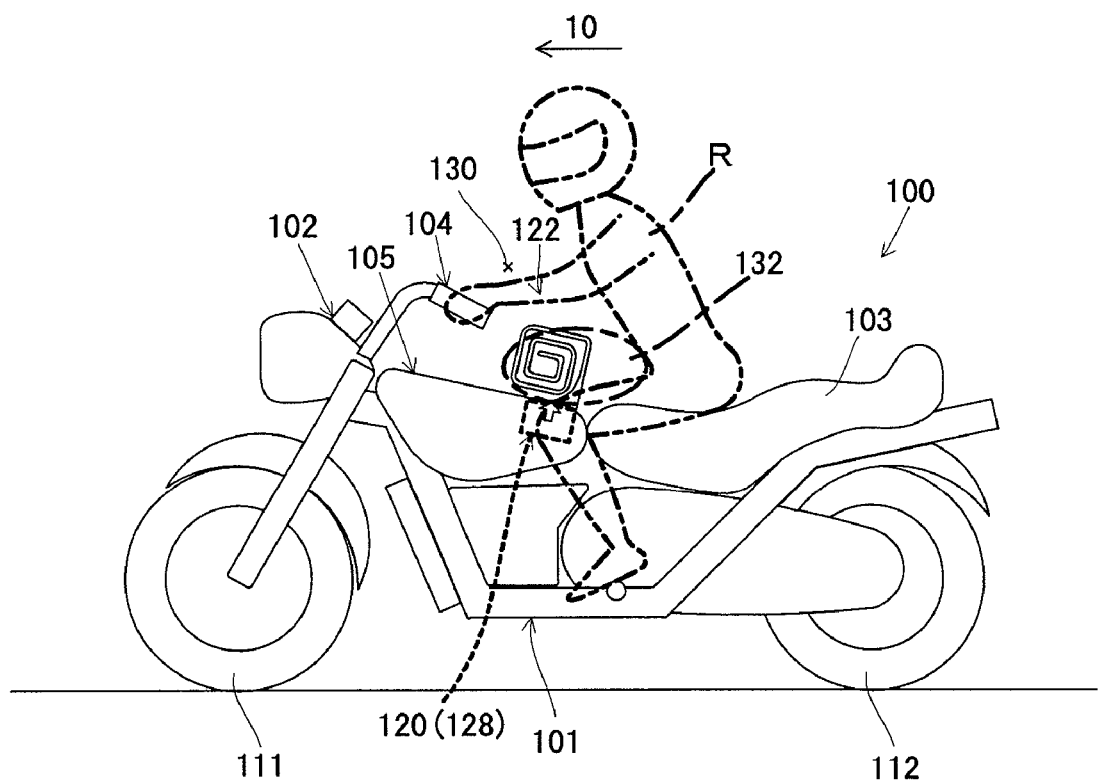

[Fig. 4]
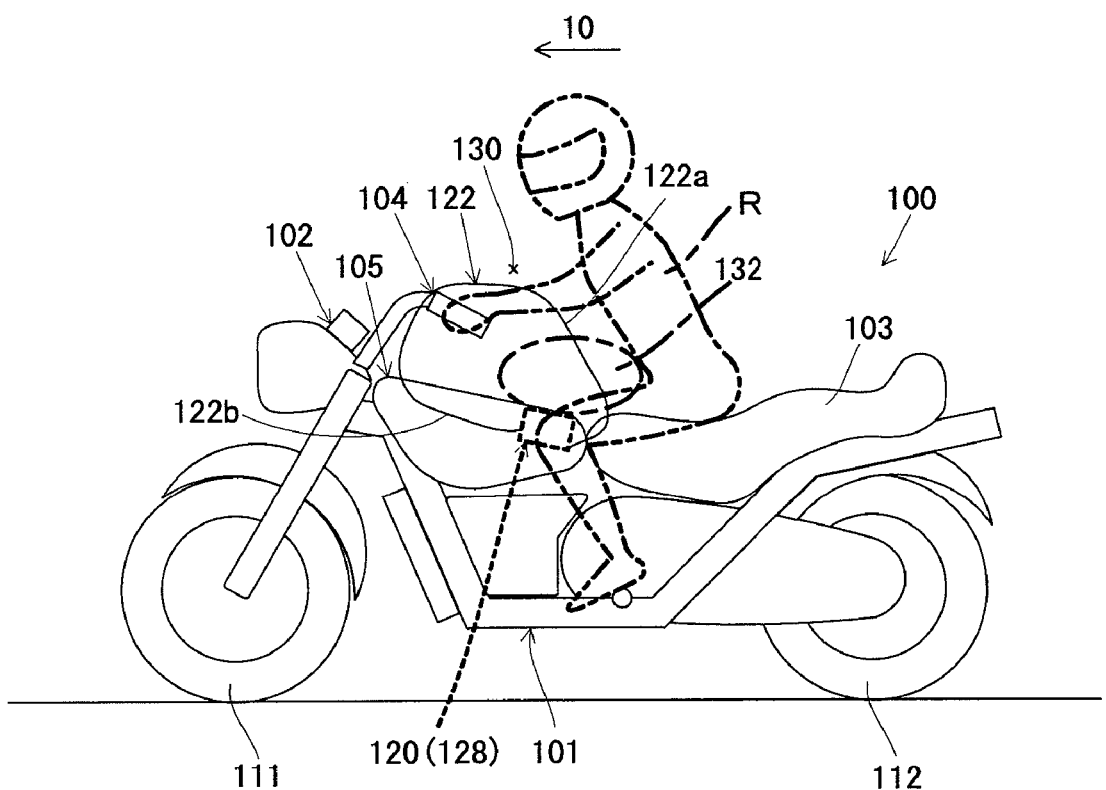

[Fig. 5]
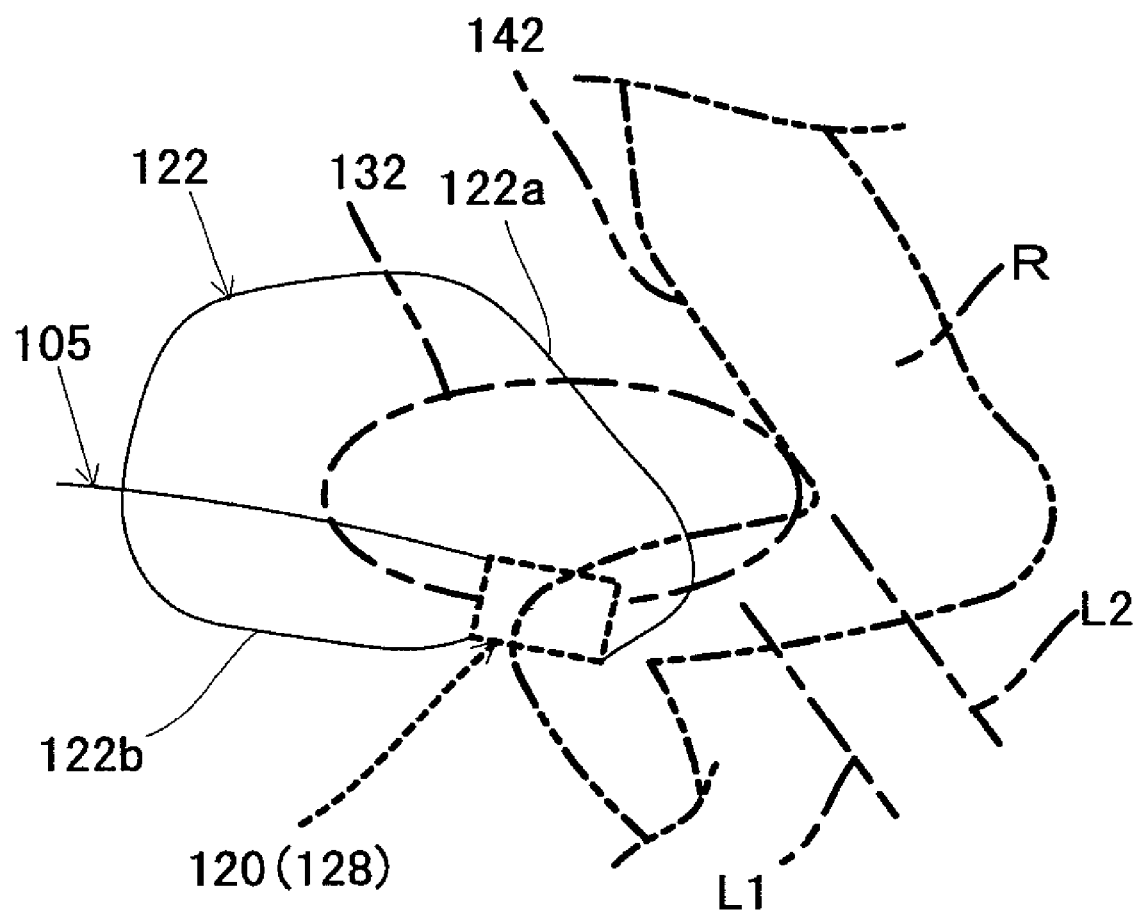

[Fig. 6]
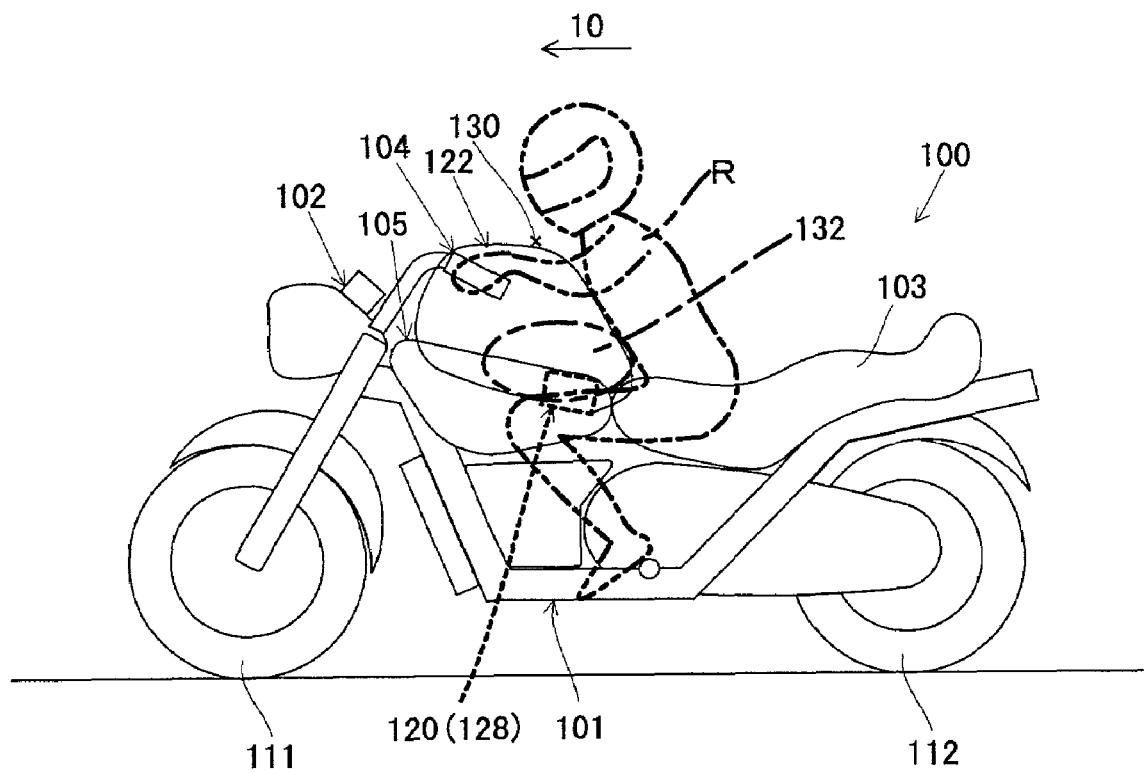

[Fig. 7]
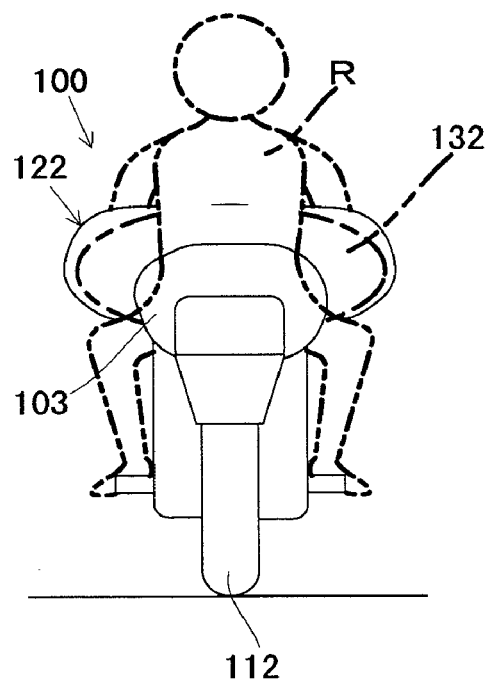
[Fig. 8]
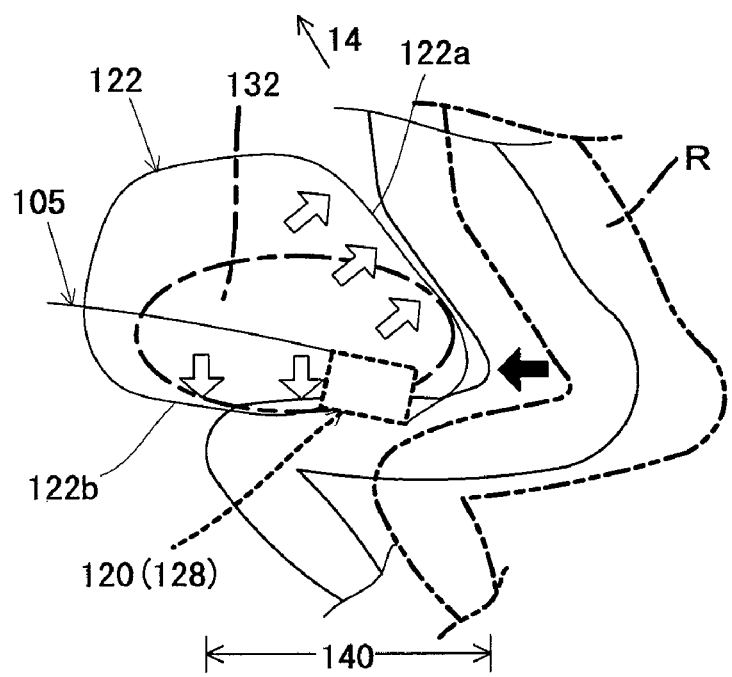

[Fig. 9]
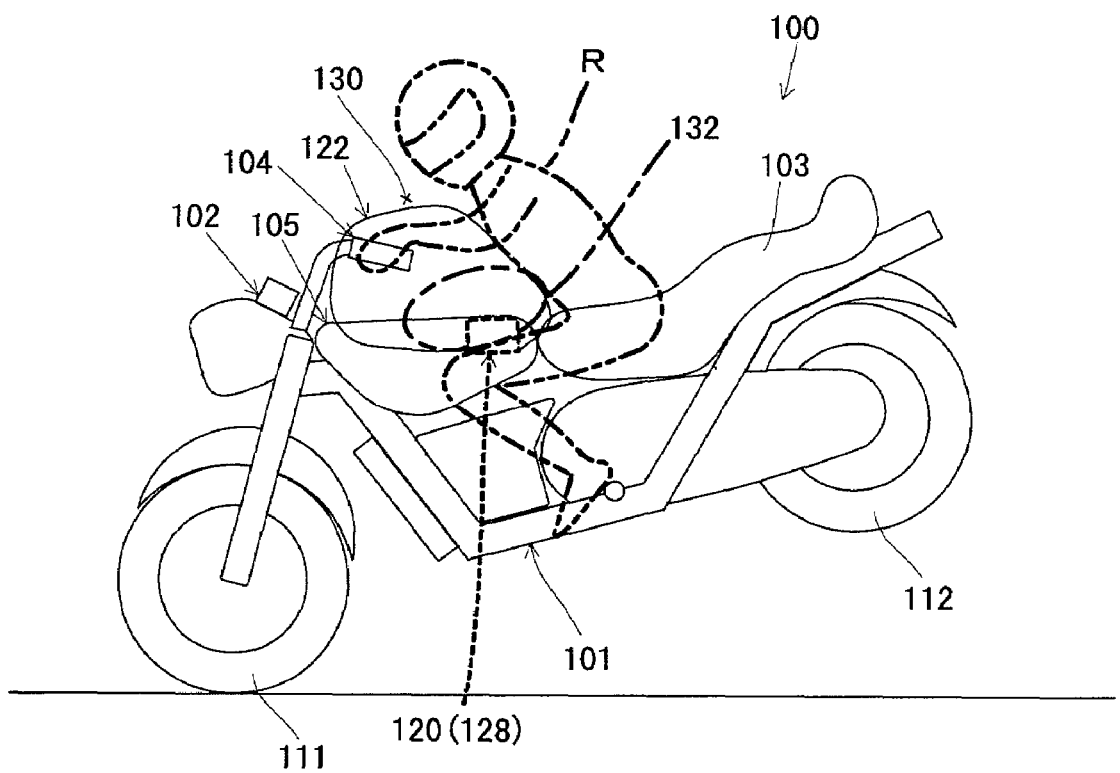

AIRBAG APPARATUS, SADDLE-TYPE VEHICLE WITH AIRBAG APPARATUS

FIELD OF THE INVENTION

The present invention relates to a technique for constituting an airbag apparatus to be mounted to a vehicle.

BACKGROUND OF THE INVENTION

In the related art, various techniques for constraining a rider by mounting an airbag apparatus on a vehicle such as a motorcycle or the like are known. For example, in a motorcycle, a technique for deploying and inflating an airbag stored in a housing mounted to a vehicle body frame by inflation gas, thereby constraining a rider in case of front collision is known (for example, see Japanese Unexamined Patent Application Publication No. 2002-137777). In this technique, a possibility to secure a wide constraining area by the airbag is proposed. However, in an airbag apparatus to be mounted to a vehicle having such a structure that the periphery of the rider is opened like the motorcycle, constitution of an improved technique effective when constraining the rider radically by the airbag in case of front collision is highly requested.

SUMMARY OF THE INVENTION

In view of such circumstances, it is an object of the present invention to provide a technique of constituting an airbag apparatus which enables further improvement of a rider constraining force in case of front collision, and techniques relating thereto.

In order to achieve the above-described object, the invention described hereinafter is provided. The invention as described hereinafter typically can be applied to a structure of an airbag apparatus which is mounted to various types of saddle-type vehicles. In this specification, the term "saddle-type vehicle" which is a typical example of the vehicle widely includes a vehicle of a type in which the rider is seated on a seat in a straddled manner. For example, a motorcycle of a touring type having also a fuel tank in front of the rider's seat and a motorcycle of a scooter type having a space formed between the rider's seat and a head pipe for supporting a handle are both included. In addition to the above-described motorcycles, vehicles having three or more traveling wheels and are configured to allow the rider to be seated in the straddled manner (for example, three-wheeled motorcycles used for door-to-door delivery service or the like, or three- or four-wheeled buggy type motorcycles for rough-terrain traveling), and vehicles traveling with skids or caterpillars and are configured to allow the rider to be seated in the straddled manner like a snowmobile or the like are also included widely in the term "saddle-type vehicle".

A first form of the present invention for solving the above-described problem is an airbag apparatus as described hereinbelow.

An airbag apparatus of the first form is an airbag apparatus including at least an airbag, and is configured to be mounted to a saddle-type vehicle. In the present invention, the airbag apparatus may have a structure to be mounted to the saddle-type vehicle in a state in which the respective components are integrally modulated, or the respective components are assembled in sequence to the vehicle.

The airbag of the present invention is supplied with inflation gas therein by an zinflation gas supply mechanism such as an inflator or the like and being deployed and inflated in an airbag deployment area formed in front of a rider in case of front collision of the vehicle. Typically, the airbag folded in a predetermined shape in advance performs deployment and inflation, thereby being deployed and inflated. Constraint of the rider is achieved by the deployed and inflated airbag constraining the rider via a constraining surface. As a typical example of a rider constraining area, there is an area in the periphery of the lumbar part formed above the knee portion (femoral region) of the rider and below the chest portion of the rider in terms of the vertical direction of the vehicle.

In particular, the airbag according to the present invention is configured to be deployed and inflated while extending the constraining surface when constraining the rider at the time of deployment and inflation along the direction connecting the abdominal portion and the chest portion of the rider for constraining the rider. In other words, in the present invention, the constraining surface of the airbag extends along the direction connecting the abdominal portion and the chest portion of the rider not only after the completion of deployment and inflation of the airbag, but also in the course of deployment and inflation of the airbag. In case of front collision of the vehicle, the constraining surface of the airbag extending along the direction connecting the abdominal portion and the chest portion of the rider constrains the constrained portion of the rider. The airbag in this structure has advantages such that a wide constraining surface for constraining the constrained portion of the rider can be secured, and the constraining surface can be formed quickly.

According to the configuration of the first form, in the vehicle having a structure in which the periphery of the rider is opened as in the case of the saddle-type vehicle, constraint of the rider can be achieved by forming the constraining surface which is effective for constraining the rider quickly in case of front collision of the vehicle. Accordingly, a rider constraining force can be improved.

In the present invention, the constraining surface of the airbag effectively includes a component extending along the direction connecting the abdominal portion and the chest portion of the rider for constraining the rider. Therefore, the shape of the constraining portion of the airbag, and the relative arrangement between the constraining surface of the airbag and the constrained surface of the rider may be modified in various manners. In the present invention, the constraining surface of the airbag may extend linearly along the direction connecting the abdominal portion and the chest portion of the rider, or may extend along a curved line. In the present invention, the constraining surface of the airbag and an extending surface extending along the direction connecting the abdominal portion and the chest portion of the rider may be extended in parallel to each other or extended in an intersecting manner.

A second form of the present invention for solving the above-described problem is the airbag apparatus as described hereinbelow.

According to the airbag apparatus of the second form, the airbag of the first form is stored in an airbag storage body mounted to the saddle-type vehicle and, in the stored state, is folded toward the vehicle-front with respect to the airbag storage body (retainer) in a rolled manner.

According to the structure of the invention of the second form, smooth deployment and inflation of the airbag in the rider constraining area is achieved while reducing interference with the rider as much as possible in the initial stage of deployment.

A third form of the present invention for solving the above-described problem is the airbag apparatus as described hereinbelow.

In the airbag apparatus of the third form, the airbag of either the first or second forms is configured to be deployed and inflated while extending the constraining surface in parallel with the extending surface which extends along the direction connecting the abdominal portion and the chest portion of the rider when constraining the rider. Accordingly, the airbag is deployed and inflated while extending the constraining surface along the direction connecting the abdominal portion and the chest portion of the rider when constraining the rider.

According to the structure of the invention of the third form, the area of the constraining surface of the portion of the airbag extending along the direction connecting the abdominal portion and the chest portion of the rider when constraining the rider can be increased, whereby the wide constraining surface for constraining the constrained portion of the rider can be secured to the utmost.

A fourth form of the present invention for solving the above-described problem is the airbag apparatus as described hereinbelow.

The airbag apparatus of the fourth form, in the structure of any of the first to third forms, has the airbag configured to be deployed and inflated locally in a lumbar part area of the rider constraining area in terms of the vertical direction of the vehicle body. The term "lumbar part area" in this specification represents an area near the lumbar part of the rider seated on a seat, and widely includes an area formed in the front, side, and around the lumbar part of the rider. The lumbar part area corresponds to the local position (local part) of the rider constraining area in terms of the vertical direction of the vehicle body (the direction of the height of the rider). Typically, the lumbar part area is defined as the range formed in the area the upwardly of the knee portion (or femoral region) of the rider seated on the seat and downwardly of the chest portion of the rider, and the airbag can be deployed and inflated within the range of the lumbar part area.

By configuring the airbag to be deployed and inflated in the area upwardly of the knee portion of the rider and downwardly of the chest portion of the rider, the rider is effectively prevented from rising up in case of the front collision of the vehicle. In other words, since the area formed upwardly of the knee portion of the rider and downwardly of the chest portion of the rider substantially corresponds to the center of gravity of the rider, by configuring the airbag to be deployed and inflated locally at least in this area, rising up of the rider upon such as pitching rotation of the vehicle as well as upon the vehicle collision can be effectively prevented to the utmost.

Therefore, according to the invention of the fourth form, constraint of the rider upon the vehicle accident can be achieved further reliably. In the present invention, slight vertical displacement of the boundary of the lumbar part area formed upwardly of the knee portion of the rider and downwardly of the chest portion of the rider is accepted.

A fifth form of the present invention for solving the above-described problem is a saddle-type vehicle with the airbag apparatus as described hereinbelow.

The saddle-type vehicle with the airbag apparatus of the fifth form is specified as the saddle-type vehicle in which the airbag apparatus of any one of the first to fourth forms is mounted.

Therefore, according to the invention of the fifth form, the saddle-type vehicle with the airbag apparatus which can achieve effective constraint of the rider in case of front collision of the vehicle mounted thereon is provided.

As described thus far, according to the present invention, by configuring the airbag to be deployed and inflated while extending the constraining surface of the airbag along the direction connecting the abdominal portion and the chest portion of the rider when constraining the rider, constraint of the rider in case of the front collision can be achieved effectively.

BRIEF DESCRIPTION OF THE DRAWINGS

FIG. 1 is a drawing of a motorcycle 100 according to an embodiment of the present invention viewed from the side of a vehicle, showing a state in which an airbag apparatus 120 is mounted to the motorcycle 100.

FIG. 2 is a drawing showing a structure of the airbag apparatus 120 in FIG. 1.

FIG. 3 is a drawing of a state in which deployment and inflation of an airbag 122 are started viewed from the side of the vehicle.

FIG. 4 is a drawing showing a state in which deployment and inflation of the airbag 122 are completed viewed from the side of the vehicle.

FIG. 5 is an enlarged view of the airbag 122 in FIG. 4.

FIG. 6 is a drawing of a state in which a rider R is constrained by the deployed and inflated airbag 122 viewed from the side of the vehicle.

FIG. 7 is a drawing of a state in which the rider R is constrained by the deployed and inflated airbag 122 viewed from the rear of the vehicle.

FIG. 8 is a drawing showing a state in which the rider R is constrained by the airbag 122 which is deployed and inflated locally in a lumbar part area 132.

FIG. 9 shows a state in which the rider is constrained upon pitching rotation when viewed from the side of the vehicle.

DETAILED DESCRIPTION OF THE PREFERRED EMBODIMENTS

Referring now to the drawings, embodiments of the present invention will be described. Referring first to FIG. 1 and FIG. 2, structures of a motorcycle 100 and an airbag apparatus 120 will be described. FIG. 1 is a drawing of the motorcycle 100 according to an embodiment of the present invention viewed from the side, showing a state in which the airbag apparatus 120 is mounted to the motorcycle 100. FIG. 2 is a drawing showing a structure of the airbag apparatus 120 in FIG. 1. The motorcycle 100 in this embodiment corresponds to an example of the "vehicle" or the "saddle-type vehicle" in the present invention.

As shown in FIG. 1, the motorcycle 100 is constituted as a motorcycle of a touring type, mainly including a vehicle body structure 101 having an engine, a main frame, and so on, a seat 103 on which a rider R can be seated in a straddled manner, a handle 104, a front wheel 111, and a rear wheel 112 and so on.

An area above the vehicle body structure 101 of the motorcycle 100 in front of the rider R is defined as a rider constraining area 130 in case of front collision of the motorcycle 100. The term "front collision" in this embodiment widely includes a mode in which the motorcycle 100 comes into collision with an object of collision in front thereof (not specifically shown for the sake of convenience). The term "rider constraining area 130" in this embodiment is an area corresponding to the "rider constraining area" in the present invention, and is defined as a space which extends in the direction of forward movement of the rider R when the rider R is moved forwardly of the motorcycle 100 by kinetic energy generated in case of front collision for constraining the rider R who is apt to be moved forwardly of the motorcycle 100.

A front portion 102 situated on a front side of a vehicle body of the vehicle body structure 101 is provided with a headlight, various meters, and switches or the like, and the airbag apparatus 120 is provided on a rear portion of a fuel tank 105 arranged rearwardly of the front portion 102. The airbag apparatus 120 is typically configured to be mounted to the vehicle body with the respective components integrally modularized. The airbag apparatus 120 in this embodiment is arranged so as to be exposed to the rider constraining area 130 for the rider R. The airbag apparatus 120 corresponds to the "airbag apparatus" in the present invention.

In this embodiment, the airbag apparatus 120 is arranged so that the direction of protrusion (deployment and inflation) of an airbag 122 (described later) which constitutes the airbag apparatus 120 is directed toward a lumbar part area 132 of the rider constraining area 130. The lumbar part area 132 is a local position (local part) in terms of the vertical direction of the vehicle body (in the direction of the height of the rider) of the rider constraining area 130, and is defined by an area formed upwardly of the knee portion (or the femoral region) of the rider R seated on the seat 103 and downwardly of the chest portion of the rider R. The lumbar part area 132 corresponds to the "lumbar part area" in the present invention.

The airbag apparatus 120 mainly includes, as shown in FIG. 2, a retainer 128 as an airbag storage body to be mounted to the motorcycle (which corresponds to the "airbag storage body" in the present invention), the airbag 122 to be stored in the retainer 128 in a folded state, and an inflator 129 stored in an inflator storage section 128a of the retainer 128 for supplying inflation gas into the airbag 122 so that the airbag 122 is deployed and inflated from the retainer 128. In this embodiment, the airbag 122 is stored (accommodated) in the retainer 128 in a state of being folded on the vehicle-front side with respect to the retainer 128 in a rolled manner, that is, in a state of being folded (wound) in a rolled manner in a direction indicated by an arrow 13 in FIG. 2. The airbag 122 corresponds to the "airbag" in the present invention. In FIG. 2, the direction of protrusion (deployment) of the airbag 122 is indicated by an arrow 12.

Here, referring now to FIG. 3 to FIG. 9, an operating state of the airbag apparatus 120 having the abovementioned structure will be described.

FIG. 3 is a drawing showing a state in which deployment and inflation of the airbag 122 are started due to the front collision of the motorcycle 100 viewed from the side of the vehicle.

As shown in FIG. 3, when the motorcycle 100 is encountered with collision in the direction of travel thereof, the rider R is apt to move toward a front (for example, the direction indicated by an arrow 10 in FIG. 3) of the motorcycle 100. In this embodiment, by a detection of the front collision, the inflator 129 is activated, and the airbag 122 is started to be protruded (deployed) from the airbag apparatus 120 (retainer 128) toward the lumbar part area 132 of the rider constraining area 130. Then, an inflated portion of the airbag 122 is formed gradually from the retainer 128 side by inflation gas which is continuously fed into the airbag 122. In this manner, the airbag 122 performs the deployment and inflation, thereby being deployed and inflated. At this time, since the airbag 122 of this embodiment is stored in the retainer 128 in the state of being folded on the vehicle-front side of the retainer 128 in a rolled manner as shown in FIG. 2, smooth deployment and inflation of the airbag 122 in the lumbar part area 132 is achieved while reducing interference with the rider R to the minimum in the initial stage of deployment.

In this manner, the state in which the airbag 122 is completely deployed and inflated is established. FIG. 4 is a drawing showing a state of the airbag 122 at the time of deployment and inflation when viewed from the side of the vehicle. As shown in FIG. 4, at the time of deployment and inflation of the airbag 122, the inflated airbag 122 is filled locally in the lumbar part area 132. In other words, the airbag 122 in this embodiment is not deployed and inflated in the wide range over the entire rider constraining area 130, but deployed locally (at the local part) and intensively in the lumbar part area 132.

FIG. 5 is an enlarged view of the airbag 122 in FIG. 4 at the time of deployment and inflation.

As shown in FIG. 5, the airbag 122 forms a constraining surface 122a for constraining the rider R at a portion opposing the rider R at the time of deployment and inflation, and forms an abutment surface 122b that comes into abutment with the fuel tank 105 on the vehicle-front side thereof with respect to the retainer 128. The airbag 122 which is completely deployed and inflated is formed into various shapes such as triangle, square or circle in side view.

In this embodiment, the relative position between the deployed and inflated airbag 122 and the retainer 128 is such that the retainer 128 is positioned on the vehicle-rear side with respect to the deployed and inflated airbag 122.

In this embodiment, the constraining surface 122a of the airbag 122 extends substantially linearly along an extension directional line L1 at the time of deployment and inflation and lies substantially in parallel with a rider front surface 142 extending along a directional line L2 connecting the abdominal portion and the chest portion of the rider R when constraining the rider. In other words, the constraining surface 122a of the airbag 122 is formed along the rider front surface 142 (constrained surface) of the rider R in the course of deployment and inflation and at the completion of the deployment and inflation. The airbag 122 is deployed and inflated while extending the constraining surface 122a substantially in parallel with the rider front surface 142, which extends along the directional line L2 connecting the abdominal portion and the chest portion of the rider R in the course of deployment and inflation.

The constraining surface 122a of the airbag 122 corresponds to the "constraining surface" of the present invention, and the rider front surface 142 of the rider R corresponds to the "extending surface" of the present invention. The mode of the airbag 122 having the constraining surface 122a of this structure corresponds to the mode that "the airbag forms the constraining surface for constraining the rider at the time of deployment and inflation, and is deployed and inflated while extending along a direction connecting the abdominal portion and the chest portion of the rider when constraining the rider", and the mode that "the airbag is deployed and inflated while extending in parallel with the extending surface which extends along a direction connecting the abdominal portion and the chest portion of the rider when constraining the rider".

In this manner, according to the airbag 122 which forms the constraining surface 122a at the time of deployment and inflation, the area of the portion of the constraining surface 122a which extends along the direction connecting the abdominal portion and the chest portion of the rider R when constraining the rider can be increased and hence the large constraining surface for constraining the rider R who is apt to move toward the front of the vehicle can be secured to the utmost, which is effective for constraining the rider R. It is also effective for constraining the rider by forming the constraining surface 122a which is effective for constraining the rider R quickly in case of front collision of the vehicle.

On the other hand, the rotational movement of the airbag 122 toward the front of the vehicle about the retainer 128 is limited by the abutment surface 122b (abutting portion) of the completely deployed and inflated airbag 122 being abutted against the vehicle members such as the fuel tank 105 or the like. In other words, the airbag 122 deployed and inflated in the rider constraining area in front of the rider R is apt to rotate toward the front of the vehicle about the retainer 128 by the load in the direction toward the front of the vehicle which is received from the rider R at the time of constraint of the rider. However, according to this embodiment, by limiting the rotational movement of the airbag 122, the movement of the airbag 122 is stabilized, whereby the constraint of the rider R can also be stabilized.

In particular, according to this embodiment, since the retainer 28 is positioned on the vehicle-rear side of the deployed and inflated airbag 122, the front side of the deployed and inflated airbag 122 with respect to the retainer 128 can be widely secured as the abutting portion with respect to the vehicle members such as the fuel tank 105 or the like. Accordingly, the movement of the airbag 122 for constraining the rider R is further stabilized by abutment between the abutment surface 122b of the deployed and inflated airbag 122 and the abutted portion of the vehicle body member such as the fuel tank 105 or the like.

The rider who has received an impact due to the front collision of the motorcycle 100 is constrained by the constraining surface 122a of the deployed and inflated airbag 122. FIG. 6 shows a state in which the rider R is constrained by the deployed and inflated airbag 122 when viewed from the side of the vehicle, and FIG. 7 shows a state in which the rider R is constrained by the deployed and inflated airbag 122 when viewed from the rear of the vehicle, and FIG. 8 shows a state in which the airbag 122 is locally deployed and inflated in the lumbar part area 132 for constraining the rider R.

As shown in FIG. 6 and FIG. 7, the rider R who has received the impact by the front collision of the motorcycle 100 is constrained by the airbag 122 which is filled in the lumbar part area 132. At this time, the airbag 122 filled in the lumbar part area 132 constrains the lumbar part and the periphery of the lower femoral region of the rider R effectively from the front, side and above. Since the abutment surface 122b of the airbag 122 comes into abutment with the fuel tank 105, the rotational movement of the airbag 122 toward the front of the vehicle is limited, whereby the constraint of the rider R is stabilized.

In particular, as shown in FIG. 8, by making the airbag 122 deployed and inflated above the knee portion (femoral region) of the rider R, rising up of the rider R in the direction indicated by an arrow 14 in FIG. 8 in case of the front collision of the vehicle can effectively prevented. In this manner, if the rider R can be constrained at least in the lumbar part area 132 by the deployed and inflated airbag 122, the constraining force for the rider R can be increased. Since the abutment surface 122b of the airbag 122 comes into abutment with the fuel tank 105 and the rotational movement of the airbag 122 toward the front of the vehicle can be limited, the effective constraint of the rider is secured even in the case of the airbag 122 which is deployed and inflated locally in the lumbar part area 132.

The rider R who has received the impact by the front collision of the motorcycle 100 is moved, for example, from a position indicated by a double-dashed line in FIG. 8 to a position indicated by a solid line toward the front of the vehicle (direction indicated by a solid arrow in FIG. 8) by a kinetic energy generated upon collision. Accordingly, the relative position between the rider R and the retainer 128 is changed. In other words, the position of the retainer 128 with respect to the rider R is in the vicinity of the knee portion (see FIG. 5) of the rider R before the front collision of the vehicle. On the other hand, when the rider R is moved to the front of the vehicle due to the vehicle front collision, it approaches the rider R and changes to the area between the knee portion and the abdominal portion of the rider R (an area 140 in the vicinity of the rider in FIG. 8) in terms of the fore-and-aft direction of the vehicle. The area 140 in the vicinity of the rider is specified as an area in the vicinity of the rider R in terms of the fore-and-aft direction of the vehicle out of the area formed on the vehicle-front side with respect to the rider R. In this structure, the airbag 122 stored in the retainer 128 is deployed and inflated in the area 140 in the vicinity of the rider formed between the knee portion and the abdominal portion of the rider R in terms of the fore-and-aft direction of the vehicle in case of front collision of the vehicle. Therefore, the constraint of the rider R by the airbag 122 deployed and inflated in the vicinity of the rider is enabled.

The position of the retainer 128 when the rider R is moved toward the front of the vehicle by the front collision of the vehicle can be set in the area 140 in the vicinity of the rider.

In this embodiment, the relative position between the deployed and inflated airbag 122 and the retainer 128 is such that the retainer 128 is positioned on the vehicle-rear side of the deployed and inflated airbag 122. In other words, in this embodiment, the consideration is taken in such a manner that the retainer 128 is arranged in the vicinity of the rider as much as possible, and the constraining surface 122a of the airbag 122 does not come too close to the rider R when the airbag is deployed and inflated. In this structure, smooth constraint of the rider R by the airbag 122 deployed and inflated in the vicinity of the rider at the time of the front collision of the vehicle is enabled.

In addition, there may be a case in which the motorcycle 100 which is encountered with the front collision is subjected to a pitching rotation due to an energy generated upon collision. FIG. 9 shows a state of rider constraint upon pitching rotation when viewed from the side of the vehicle.

As shown in FIG. 9, upon the pitching rotation of the motorcycle 100, the constraint state of the rider R is maintained by the inflated airbag 122. In particular, since it is configured to allow the airbag 122 to be deployed and inflated in the lumbar part area 132 situated downwardly of the chest portion of the rider R to press and hold the femoral region of the rider R which is apt to rise upward from above in the direction indicated by the arrow 14 in FIG. 8, the femoral region is caught by the deployed and inflated airbag 122, and hence the rider R is effectively constrained from above upon such as the pitching rotation of the vehicle. At this time, the abutment surface 122b of the airbag 122 is maintained in the state of being abutted against the fuel tank 105, the rotational movement of the airbag 122 toward the front of the vehicle is continuously limited, and hence the state in which the constraint of the rider R is stabled is maintained.

As described above, according to this embodiment, since the constraining surface 122a of the airbag 122 in the state of being deployed and inflated extends substantially in parallel with the rider front surface 142 extending in the direction connecting the abdominal portion and the chest portion of the rider R upon constraint of the rider, the area of the portion of the constraining surface 122a which extends along the direction connecting the abdominal portion and the chest portion of the rider R when constraining the rider can be increased and hence the large constraining surface for constraining the rider R who is apt to move toward the front of the vehicle can be secured to the utmost, whereby the rider R can be constrained. Also, the constraining surface 122a effective for constraining the rider R can be formed quickly so that the rider can be constrained.

According to this embodiment, by configuring the airbag 122 to be deployed and inflated locally at least in the lumbar part area 132 in the rider constraining area 130, the rider R can be constrained, whereby the constraining force for the rider R can be increased. In other words, since the lumbar part area 132 formed above the knee portion of the rider R and below the chest portion of the rider R substantially matches the center of gravity of the rider R, and hence by holding the femoral region of the rider by the locally deployed and inflated airbag from above at least in the lumbar part area 132, the rising up of the rider can be reliably prevented even upon such as the pitching rotation of the vehicle as well as upon the vehicle collision.

In this embodiment, since the airbag 122 is locally deployed and inflated in the lumbar part area 132, it is effective for downsizing the airbag 122 and the retainer 128 or the like for storing the airbag 122 in comparison with the structure in which the airbag 122 is deployed and inflated in the wide range entirely in the rider constraining area 130. For example, it is also conceivable to allow the airbag 122 to be deployed and inflated locally in an area corresponding to the shoulder portion of the rider. However, in this structure, it is necessary to make the airbag to be filled in the wide range, and hence the downsizing of the airbag is limited. In this embodiment, since the airbag 122 is deployed and inflated toward the lumbar part area 132 which is close to the position of installation of the airbag apparatus 120, the airbag 122 and the retainer 128 or the like can further be downsized. The constraint of the rider can be maintained while downsizing the airbag 122 and the retainer 128 or the like.

The present invention is not limited to the above-described embodiment, and various applications or modifications are conceivable. For example, embodiments shown below in which the above-described embodiment is applied can be implemented.

Although the case in which the constraining surface 122a of the airbag 122 extends substantially linearly at the time of deployment and inflation and lies substantially in parallel with the rider front surface 142 has been described in the above-described embodiment, in the present invention, the constraining surface of the airbag at the time of deployment and inflation must simply have a component extending along the direction connecting the abdominal portion and the chest part of the rider when constraining the rider. In the present invention, the constraining surface 122a of the airbag 122 at the time of deployment and inflation can extend linearly or along a curved line. In the present invention, the constraining surface 122a of the airbag 122 and the rider front surface 142 may be arranged in parallel with each other or in an intersecting manner at the time of deployment and inflation. In the present invention, the airbag 122 must simply have at least the constraining portion such as the constraining surface 122a when being deployed and inflated, and the airbag 122 as a whole may be formed into various shapes such as triangle, square, and circle in side view.

Although the airbag apparatus 120 provided with the airbag 122 which is deployed and inflated in the lumbar part area 132 out of the rider constraining area has been described in the above-described embodiment, it is also possible to apply the present invention to the structure of the airbag apparatus provided with the airbag which is deployed and inflated in the rider constraining area other than the lumbar part area 132.

Although the case in which the airbag 122 deployed and inflated in the lumbar part area 132 constrains the periphery of the lumbar part and the periphery of the femoral region of the rider R from the front, side, and above has been described in the above-described embodiment, the airbag 122 can be configured to wrap around the lumbar part of the rider R to the rear side.

Although the lumbar part area 132 is defined as the area formed above the knee portion (or the femoral region) of the rider R seated on the seat 103 and below the chest portion of the same rider R, the area can be varied (enlarged or reduced) in the vertical direction as needed.

Although the motorcycle 100 of, so-called, a touring type has been described in the above-described embodiment, the present invention can also be applied to other types of motorcycles such as a scooter type having a space between the handle and the seat, or to vehicles other than the motorcycle 100.

In the above-described embodiments, the case in which the airbag apparatus 120 (retainer 128) is arranged rearwardly of the fuel tank 105 has been described. However, the position to arrange the airbag apparatus 120 (retainer 128) can be changed depending on the types or the specifications of the motorcycle and so on. For example, in the motorcycle of the scooter type, the airbag apparatus 120 (retainer 128) can be arranged on the vehicle body at the lower portion of the seat or the front portion.

What is claimed is:

1. An airbag apparatus for a saddle-type vehicle including a seat for a rider, the airbag apparatus comprising:
    a retainer for being mounted at a predetermined location to the vehicle adjacent to the seat and having a rearmost portion forwardly of the seat in a longitudinal fore-and-aft direction along the vehicle;
    an airbag for being deployed from the retainer during a front collision with the vehicle;
    a central portion of the airbag that upon airbag inflation is centrally aligned with the vehicle seat in the longitudinal fore-and-aft direction so as not to be offset laterally therefrom;
    a constraining surface of the central portion of the airbag having a forwardly inclined configuration so that upon airbag inflation the forwardly inclined constraining surface faces a rider seated on the vehicle seat and extends in alignment with and in generally the same direction as a front area between a rider's chest and abdominal regions; and
    at least a portion of the constraining surface that is disposed rearwardly of the retainer rearmost portion,
    wherein the airbag has a top portion to which the constraining surface extends with the sizing of the constraining surface being such that upon airbag inflation the top portion extends in the generally fore-and-aft direction along the vehicle below a rider's head region.

2. An airbag apparatus for a saddle-type vehicle including a seat for a rider, the airbag apparatus comprising:
    a retainer for being mounted at a predetermined location to the vehicle adjacent to the seat and having a rearmost portion forwardly of the seat in a longitudinal fore-and-aft direction along the vehicle;
    an airbag for being deployed from the retainer during a front collision with the vehicle;
    a central portion of the airbag that upon airbag inflation is centrally aligned with the vehicle seat in the longitudinal fore-and-aft direction so as not to be offset laterally therefrom;
    a constraining surface of the central portion of the airbag having a forwardly inclined configuration so that upon airbag inflation the forwardly inclined constraining surface faces a rider seated on the vehicle seat and extends in alignment with and in generally the same direction as a front area between a rider's chest and abdominal regions; and at least a portion of the constraining surface that is disposed rearwardly of the retainer rearmost portion, wherein the airbag has a lower abutment portion extending in the fore-and-aft direction in engagement with a body portion of the vehicle upon airbag inflation to keep rotation of the airbag to a minimum with a rider engaged therewith during a front collision.

3. The airbag apparatus of claim 2 wherein the airbag has a predetermined, inflated generally wedge shaped configuration between a rider's knee and chest regions.

4. The airbag apparatus of claim 2 wherein the constraining surface has a lower portion that is further rearwardly than an upper portion thereof in the fore-and-aft direction along the vehicle.

5. The airbag apparatus of claim 4 wherein the inclined configuration of the constraining surface is such that the constraining surface extends substantially linearly between the upper and lower portions thereof.

6. The airbag apparatus of claim 2 wherein the configuration of the constraining surface is coordinated with size of the airbag and the predetermined location of the retainer mounting to the vehicle so that a rider moves forwardly into engagement with the airbag constraining surface during a front collision of the vehicle.

7. An airbag apparatus for a motorcycle having a body including a seat for a rider rearwardly of a fuel tank in a fore-and-aft direction along the motorcycle body and handle bars extending up over the fuel tank, the airbag apparatus comprising:

a single retainer fixedly mounted to a rear portion of the fuel tank adjacent and forwardly of the seat in the fore-and-aft direction along the motorcycle body;

a single inflator in the retainer so that no other inflators beyond the single inflator are operatively mounted to the fuel tank;

a single, compactly sized airbag in the retainer for being inflated by inflation gas supplied by the inflator for being deployed from the retainer with the inflator staying in the retainer and the retainer staying fixed to the fuel tank rear portion upon airbag deployment during a front collision with the motorcycle, and so that no other airbags beyond the single airbag are operatively mounted to the fuel tank;

an interior space of the single, inflated airbag having a width and a height with the width in a lateral direction across the motorcycle body being larger than the height in a vertically upward direction to provide the inflated airbag with a short and wide configuration so that the airbag is inflated in a predetermined area generally rearwardly of the handle bars, generally forwardly of the seat, and adjacent the fuel tank beyond either side thereof for engaging upper leg portions of the rider;

a constraining surface of the inflated airbag that faces the rider and which extends at a forward incline upwardly from adjacent the seat to generally match an upper body orientation of the rider; and a lowermost abutment surface of the short and wide inflated airbag that extends forwardly in the fore-and-aft direction from a forwardmost portion of the retainer in engagement with the fuel tank for the majority of the length thereof forwardly of the retainer in the fore-and-aft direction so that there is no spacing between the abutment surface of the inflated airbag and the adjacent fuel tank.

8. The airbag apparatus of claim 7 wherein the compactly sized airbag has a top portion generally extending only slightly beyond or below a top portion of the handle bars.

9. The airbag apparatus of claim 7 wherein the constraining surface has a lower portion rearwardly of the retainer and an upper portion forwardly of the retainer.

10. The airbag apparatus of claim 7 wherein the inflated airbag has a generally wedge shaped configuration to fit in an area extending generally between the seat and the handle bars of the motorcycle.

11. The airbag apparatus of claim 7 wherein the airbag has lower portions extending forwardly from the retainer on either side of the fuel tank for engaging upper leg portions of the rider for generally keeping the rider on the seat during forward pitching of the motorcycle upon a forward collision therewith.

12. The airbag apparatus of claim 7 wherein the airbag has a stored state in the retainer prior to deployment with the airbag being forwardly roll-folded in the stored state thereof.

13. The airbag apparatus of claim 7 wherein the airbag is configured to be deployed and fully inflated in a vertical direction proximate the fuel tank so as to be concentrated in a lumbar part area generally above a knee portion and below a chest portion of the rider.

* * * * *